US012086112B2

(12) United States Patent
Novotny et al.

(10) Patent No.: US 12,086,112 B2
(45) Date of Patent: Sep. 10, 2024

(54) PROCESSING LARGE MACHINE LEARNING DATASETS

(71) Applicant: International Business Machines Corporation, Armonk, NY (US)

(72) Inventors: Petr Novotny, Mount Kisco, NY (US); Hong Min, Poughkeepsie, NY (US); Shaikh Shahriar Quader, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 17/014,179

(22) Filed: Sep. 8, 2020

(65) Prior Publication Data

US 2022/0075761 A1 Mar. 10, 2022

(51) Int. Cl.
  *G06F 17/00* (2019.01)
  *G06F 16/21* (2019.01)
  *G06F 16/22* (2019.01)
  *G06N 20/00* (2019.01)

(52) U.S. Cl.
  CPC ........ *G06F 16/211* (2019.01); *G06F 16/2282* (2019.01); *G06N 20/00* (2019.01)

(58) Field of Classification Search
  CPC .. G06F 16/211; G06F 16/2282; G06F 16/252; G06N 20/00
  USPC .......................................................... 706/12
  See application file for complete search history.

(56) References Cited

U.S. PATENT DOCUMENTS

| 9,686,086 | B1 | 6/2017 | Nguyen | |
|---|---|---|---|---|
| 10,268,645 | B2 | 4/2019 | Vaitheeswaran | |
| 10,346,375 | B2 | 7/2019 | Chen | |
| 2004/0267712 | A1* | 12/2004 | Papanyan | G06F 16/9574 |
| 2020/0319857 | A1* | 10/2020 | Lonial | G06F 3/0482 |
| 2020/0327252 | A1* | 10/2020 | McFall | H04L 9/008 |
| 2020/0379995 | A1* | 12/2020 | Rajaperumal | G06F 16/2393 |

FOREIGN PATENT DOCUMENTS

WO     2022053266 A1     3/2022

OTHER PUBLICATIONS

"Ibmdbpy—Accelerating Python Analytics by In-Database Processing", IBM, @ Copyright 2016, IBM Corp. Last updated on Feb. 9, 2017, 6 pages.
D'silva, Joseph, "AIDA An Agile Abstraction for Advanced In-database Analytics", Jul. 2020, 84 pages.
(Continued)

*Primary Examiner* — Jason T Edwards
(74) *Attorney, Agent, or Firm* — Caleb D. Wilkes

(57) ABSTRACT

Embodiments of the present invention provide methods, computer program products, and systems. Embodiments of the present invention can receive, by a computing device, a request to access a datapoint of a machine learning dataset contained in a database. Embodiments of the present invention can access, by the computing device, a virtual data frame that includes a schema which represents a structure of the machine learning dataset in the database. Embodiments of the present invention can retrieve, by the computing device, the datapoint of the machine learning utilizing the virtual data frame and return, by the computing device, the retrieved datapoint in response to the request.

17 Claims, 3 Drawing Sheets

(56) References Cited

OTHER PUBLICATIONS

Fouche et al., "In-Database Analytics with ibmdbpy", ,SDBM 'Js, Julv 9-11, 2018, Bozen-Bolzano, Italy, ACM ISBN 978-1-4503-6505-5/18/07, 4 pages.

Mnish D'silva et al., "AIDA—Abstraction for Advanced In-Database Analytics", Aug. 2018, DOI: https://doi.org/10.14778/3236187.3236194, 14 pages.

"Patent Cooperation Treaty PCT Notification of Transmittal of the International Search Report and the Written Opinion of the International Searching Authority, or the Declaration", Applicant's file reference P202003826, International application No. PCT/EP2021/072750, Date of Mailing Nov. 29, 2021 (Nov. 29, 2021), International filing date Aug. 16, 2021 (Aug. 16, 2021), 14 pages.

Ciesielski, Filip, "How to handle large datasets in Python with Pandas and Dask", May 16, 2019, 23 pages, <https://towardsdatascience.com/how-to-handle-large-datasets-in-python-with-pandas-and-dask-34f43a897d55>.

Seif, George, "3 simple ways to handle large data with Pandas", May 14, 2019, 5 pages, <Retrieved from https://towardsdatascience.com/3-simple-ways-to-handle-large-data-with-pandas-d9164a3c02c1>.

"Vertica_ml_python vdataframe", GitHub, Edited on Apr. 5, 88 pages, <https://github.com/vertica/Vertica-ML-Python/wiki/vertica_ml_python.vdataframe>.

Fard et al., "Vertica-ML: Distributed Machine Learning in Vertica Database", SIGMOD '20, Jun. 14-19, 2020, Portland, Or, USA, pp. 755-768.

* cited by examiner

PROCESSING LARGE MACHINE LEARNING DATASETS

BACKGROUND

The present invention relates generally to processing large machine learning datasets, and more particularly to processing large machine learning datasets with zero-copy in a database Virtual Data Frame.

Traditionally, machine learning refers to a study and construction of algorithms that can learn from and make predictions on data. These algorithms function by making data-driven predictions or decisions, through building a mathematical model from input data. The data used to build the final model usually comes from multiple datasets.

In particular, three datasets are commonly used in different stages of the creation of the model. The model is initially fit on a training dataset, which is a set of examples used to fit the parameters (e.g. weights of connections between neurons in artificial neural networks) of the model. The model (e.g. a neural net or a naive Bayes classifier) is trained on the training dataset using a supervised learning method, for example using optimization methods such as gradient descent or stochastic gradient descent. In practice, the training dataset often consists of pairs of an input vector (or scalar) and the corresponding output vector (or scalar), where the answer key is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation.

As discussed above, datasets are an integral part of the field of machine learning. Major advances in this field can result from advances in learning algorithms (such as deep learning), computer hardware, and less-intuitively, the availability of high-quality training datasets. High-quality labeled training datasets for supervised and semi-supervised machine learning algorithms are usually difficult and expensive to produce because of the large amount of time needed to label the data. Although they do not need to be labeled, high-quality datasets for unsupervised learning can also be difficult and costly to produce.

A DataFrame is a two-dimensional data structure, i.e., data is aligned in a tabular fashion in rows and columns. Some features of a DataFrame include columns that can be of different types, sizes, labeled axes (e.g., rows and columns), etc. In some instances, the Dataframe can perform arithmetic operations on rows and columns within the DataFrame. Virtual DataFrames (VDF) refer to a data frame that typically has one or more commands that are locally stored on a database (e.g., an SQL database). Using lazy evaluation, VDFs can download data in the last moment. In this sense, the "virtual data frame" is virtually local, yet truly local when finally referenced outside of SQL-aware functions.

Retrieving raw data and machine learning data sets from remote data sources (e.g., database) requires network bandwidth and can cause delays. For example, large parallel workloads can overload networks and data centers. In other instances, workstations have limited resources (e.g., RAM, CPU, etc.) with which to process these large datasets. As computer architecture becomes increasingly complex, more points of failures can be introduced. In other instances, co-located data processing on a database server may not be feasible. Finally, data copying can sometimes not be done in real-time.

SUMMARY

According to an aspect of the present invention, there is provided a computer-implemented method. The method comprises receiving, by a computing device, a request to access a datapoint of a machine learning dataset contained in a database; accessing, by the computing device, a virtual data frame that includes a schema which represents a structure of the machine learning dataset in the database; retrieving, by the computing device, the datapoint of the machine learning utilizing the virtual data frame, wherein the schema of the virtual data frame allows for a directed retrieval of the datapoint; and returning, by the computing device, the retrieved datapoint in response to the request.

BRIEF DESCRIPTION OF THE DRAWINGS

Preferred embodiments of the present invention will now be described, by way of example only, with reference to the following drawings, in which.

DETAILED DESCRIPTION

Figure 1:
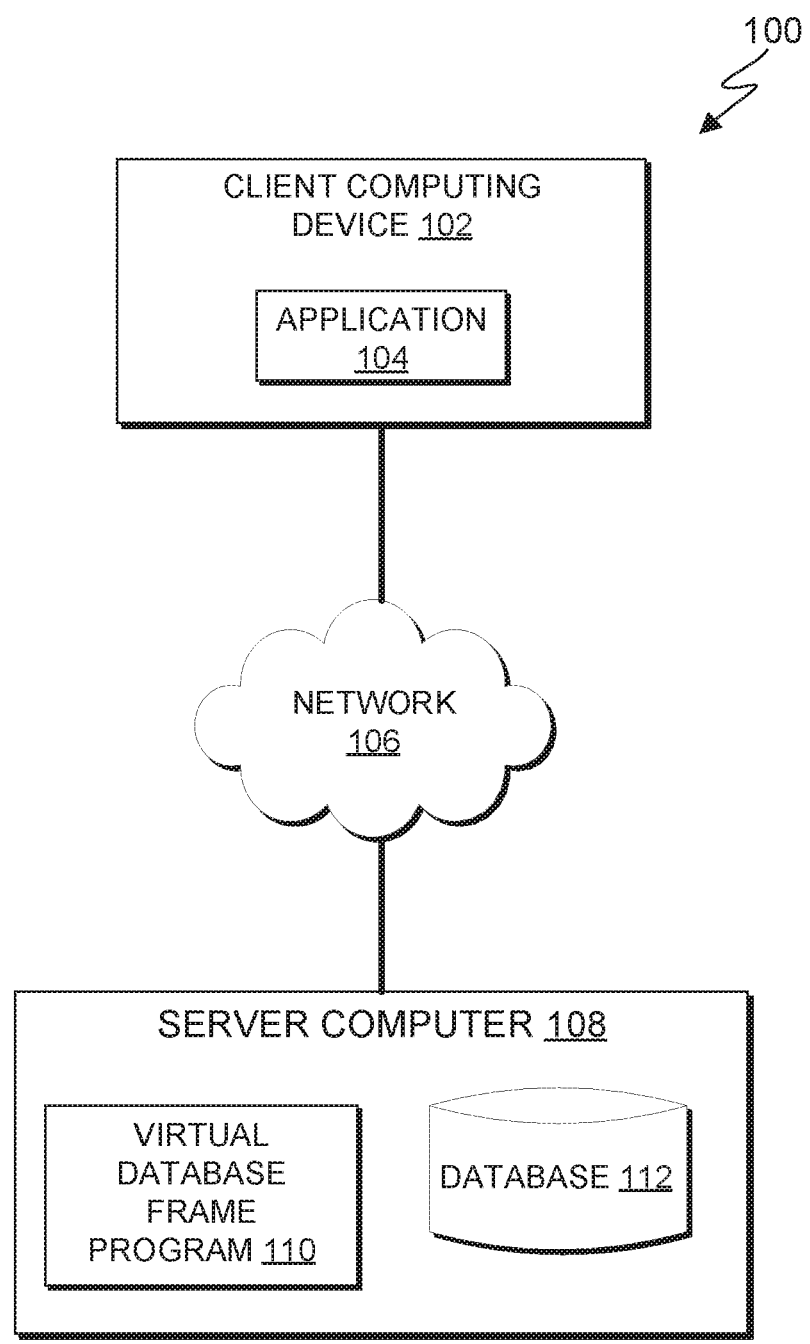
FIG. 1 depicts a block diagram of a computing system, in accordance with an embodiment of the present invention.

Embodiments of the present invention recognize that processing machine learning datasets in memory is resource intensive and, at times, not feasible. In some instances, retrieving raw data from remote data sources (e.g., databases) requires network bandwidth. This could lead to delays in work (e.g., loading a 100 M row or 25 GB from a remote database source to a Pandas DataFrame could take about 75 minutes). In certain instances, large parallel workloads can overload networks and data centers. This could lead to increased or unforeseen costs that could add up each time data needs to be refreshed.

Further problems can be highlighted when considering that workstations have limited resources (e.g., RAM, CPU, etc.). As such, embodiments of the present invention recognize that DataFrame and other structures are memory intensive, that is DateFrames and other structures may require that they be fully loaded in memory. Thus, the performance of the workstation could be adversely affected (e.g., slowed). In some cases, these large datasets may not fit into memory at all (e.g., 100 million rows may need more than 64 GB to load).

Embodiments of the present invention further recognize that problems such as those described above are further complicated with increasing architectural complexity of systems. For example, with more systems processing data, more points of failures are added to the architecture. This can be further complicated with user requirements and privacy regulations. For example, privacy regulations (e.g., GDPR) may require all of the systems processing the data meet data protection and lineage requirements.

In some instances, processing co-located data on a database server may not be feasible. For example, data processing tools (e.g., Pandas) may not be supported by all platforms (e.g., respective operating systems) that the database product supports. In these instances, installing and using data processing tools on the database server will shrink the amount of hardware resources available to the database engine. This in turn could impact the database engine's ability to meet its Service Level Agreements (SLAs) to its regular Structured Query Language (SQL) workloads. Thus, embodiments of the present invention recognize that installing and maintaining these required packages on the database server will become an overhead.

Finally, embodiments of the present invention recognize that processing large machine learning datasets in memory may not be done in real time. For example, when data is copied from the source to a separate system for processing, the data transfer happens during an off-peak hour or at a set schedule, making it difficult to extract real-time insights from data.

Embodiments of the present invention recognize the problems described above and provide solutions for processing large machine learning datasets in memory. For example, embodiments of the present invention utilize less resources, allow for co-located data process, and allow for real time data insights. Embodiments of the present invention process large machine learning datasets in memory by providing zero-copy with in-database Virtual DataFrame as discussed in greater detail later in this Specification.

Users typically define which service endpoint or its combination to use at solution/system deployment time. This selection can lead to maintenance challenges and/or potentially degrading solution perform. Embodiments of the present invention provide solutions to these challenges by dynamically determining which specific method/service endpoint to execute for a specific data set to get an overall best of the solution/system. Specifically, for software systems that are rule-driven or have probabilistic nature (AI/ML) driven, and implemented as microservices framework, the final, optimal result is not necessarily, a result of best approaches from each service.

Embodiments of the present invention dynamically determine which method or service endpoint to use by providing an optimization system that produces a result that is best, overall. In this embodiment, "best overall" can be defined as an optimal solution that satisfies a user's requirements in an efficient manner (e.g. using the least amount of resources, processing faster, etc.). Certain embodiments of the present invention can further transmit results (e.g., recommendations) to users upon complete.

In an example environment, there can be services with multiple end points, each one uses different artificial intelligence (AI) methods. Each service has an ability to assess performance of each end point (e.g., quality of results, performance, etc.) for specific data (e.g., a user). Each service could be used consequently or parallel within a product/system. Embodiments of the present invention optimize a service chain (e.g., comprising service end points) that satisfies a user request while maintaining that each service can make an autonomous decision on a respective "best" method/end-point. In other words, embodiments of the present invention can select a different end point than the endpoint selected by its service if the different end point produces a more optimal service chain.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 3.

In this embodiment, client computing device 102 is a user device associated with a user and includes application 104. Application 104 communicates with server computer 108 to access virtual database frame program 110 (e.g., using TCP/IP) to access user and database information. Application 104 can further communicate with virtual database frame program 110 to transmit instructions to process large machine learning datasets in memory, as discussed in greater detail with regard to FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts virtual database frame program 110 and database 112. In some embodiments server computer 108 can include a virtual database frame (not shown). In other instances, server computer 108 can represent a Virtual DatabaseFrame (VDF).

In this embodiment, virtual database frame program 110 resides on server computer 108. In other embodiments, virtual database frame program 110 can have an instance of the program (not shown) stored locally on client computer device 102. In yet other embodiments, virtual database frame program 110 can be stored on any number or computing devices.

In this embodiment, a Virtual DataFrame represents a dataset in memory. In this embodiment, a VDF only holds a schema which represents a structure (e.g., columns, types, etc.). Each schema contains information about mapping to an underlying cache table. Data remaining stored in its permanent location is defined as being stored in a remote database (not shown). In this embodiment, the cache table contains any intermediary result. For example, the cache table can contain data which are result of running any data related operation by the client/data scientist such as data transformation functions such as casting, conversion, any mathematical operation, any string modification operation etc. In this embodiment, defining the DataFrame i.e., its schema, can result in creation of a cache table, depending on implementation.

Each VDF is a shallow copy of a respective cache-table. In this embodiment, a shallow copy of a cache-table is defined as a general mapping to an underlying cache-table whereas a deep copy of the cache-table refers to an actual clone of an underlying cache-table into another derived cache table (e.g., dependent or subsequent VDF)—implicitly as a side effect of the functions the client uses (as a result of any projection function such as a group by a specific column and aggregation on several others) or explicitly on request by the client (e.g., the data scientist knows which copy of the dataset to use when applying any modification functions (e.g., normalization)). In other words, a deep copy of the cache-table can be accessed implicitly or explicitly. For example, a deep copy can be accessed when invoking specific functions which copy or aggregate data (e.g., by a query command of groupby( ). A deep copy can be accessed explicitly when a user (e.g., an analyst) intentionally clones a VDF with a deep copy argument.

In this embodiment, the schema does not need to directly map to the underlying cache-table. The cache-table can have more (but not less columns).

In this embodiment, the cache-table can serve as an underlying dataset for multiple dependent VDFs. Any modification to the cache-table is immediately affecting all dependent VDFs. For example, a data scientist can clone the VDF in memory (e.g., the client memory). This would result in two VDFs pointing to the same cache table.

Invocations of functions (e.g., by virtual database frame program 110), are translated into database operations (e.g., SQL statements) and executed against the cache table. In this way, virtual database program 110 can leverage schemas unique to the Virtual DataFrame to map invocation of functions to the in-database objects and statements.

In this embodiment, virtual database frame program 110 leverages the VDF by transmitting instructions of the VDF to replicate an interface (e.g., Panda's DataFrame). For example, current implementations of DataFrame in various packages (e.g., scikit). In this embodiment, virtual database frame program 110 can transmit instructions to the VDF to expose/implement any such established interface/API so as to allow presentation of underlying data in any such way. In other words, the VDF can replicate an appearance and behavior of the interface.

In this embodiment, virtual database frame program 110 utilizes the Virtual DataFrame to facilitate zero-copy of data being requested. In this embodiment, zero-copy is defined as having all operations executed in the respective database. In this embodiment, data is retrieved only when explicitly requested. For example, virtual database frame program 110 aggregates and retrieves small subsets of data to memory in response to a specific function (e.g., a count). In some embodiments, virtual database frame program 110 allows for a predefined sample strategy to return a query for large sets. In this way, virtual database frame program 110 reduces the amount of returned data (e.g., when retrieving data for visualization).

In this embodiment, virtual database frame program 110 leverages the Virtual DataFrame by utilizing VDF function return types and function mechanisms. In this embodiment, VDF function can include returning another VDF, a single value, or return sets (e.g., array).

Examples of a VDF function that returns another VDF include returning a shallow copy or a deep copy. For example, when returning a shallow copy, the VDF can return a new VDF with modified schema but refers to the same cache table (e.g., test_df.drop("PassengerId", axis=1). Another function includes a command that returns an explicitly deep copy that creates a copy of the cache table and can include subsets of VDF (e.g., columns etc., which are returned with the following command, Y_train=train_df ["Survived"]). In contrast, a deep copy can return another VDF with new schema and cache table with the command, groupby( )

Single values can be retrieved to memory with the following command: count( ) while arrays (i.e., sets) can be retrieved into memory (e.g., test_df.head(10)) of a predefined sample strategy.

Examples of VDF function mechanisms (e.g., applications to cache tables) include functions that are applied to a cache table, functions that are applied to schema, nested VDF arguments, and invocation chaining. For example, functions applied to a cache table (e.g., fillna( )) are directly translated into database statements and applied to the cache table (e.g., dataset['Embarked']=dataset['Embarked'].fillna (freq_port)—fills na in column "embarked" in cache table). In this example, "Embarked" is the name of the column—thus dataset['Embarked'] takes that column in the dataset, "fillna" fills missing values in that column with value in "freq_port".

Functions applied to schema can produce new VDF with modified schema pointing to the same cache table (e.g., test_df.drop("PassengerId", axis=1)—new VDF with schema without "PassengerId" column, but pointing to same cache table). The function drop removes the column passernferid from the test_df dataset. The axis argument says that the first argument passengerid identifies column (nor a row).

Nested VDF arguments can include some functions that may have arguments which are nested invocations of other VDF functions (e.g., train_df[train_df['Survived']==0][feature].value_counts( )). Virtual database frame program 110 ensures that these are evaluated in memory, based on schema, resulting either into schema modification or application on the underlying cache table. In this embodiment, virtual database frame program 110 enables users to provide nested VDF arguments to retrieve data points in a more efficient manner. The example above shows an aggregation function value_counts( ) which is executed on a column identified by the variable "feature", and on a specific subset which is filtered by the condition dataset['survived']==0. The dataset['survived'] values come from dataset/VDF and must be evaluated first so that the train_df can be filtered. The implementation may be evaluated in memory or in database based on the schema. In this example, the more efficient would be in database.

Invocation chaining can provide step by step retrieval (i.e., returning) of modified VDFs with modified schema or modified cache tabled that is controlled by the compiler (e.g., at code execution). Invocation chaining can be accomplished with the following command: train_df[['Embarked', 'Survived']].groupby(['Embarked'], as_index=False) .mean( )sort_values(by='Survived', ascending=False).

In this embodiment, virtual database frame program 110 ensures that all operations are executed in the database. For example, virtual database frame program 110 can transmit instructions to the VDF (e.g., using command and functions described above) to use an in-database cache table that represents a current state of the dataset. In this embodiment, multiple Virtual DataFrames can use a single cache table (e.g., same as multiple shallow copy DataFrames use same numpy array).

In this manner, virtual database frame program 110 can leverage the VDF (as discussed above) to provide performance acceleration benefits. For example, performance is streamlined into an integrative and sequential execution. In this embodiment, virtual database frame program 110 can enable execution of short code sequences such as during data exploration in Jupyter Notebook and allow for execution of Python code files during runtime as opposed to the typical execution of step by step operations on the VDF.

The methodologies and functions of virtual database frame program 110 can also enable aggregated execution. For example, virtual database frame program 110 can leverage the VDF to collect a sequence of operations (e.g., with each operation being a single VDF scheme and/or cache-table database operation) which can be executed as a single batch statement, thus accelerating the processing of information.

Thus, virtual database frame program 110 provides the following advantages: functions can be applied at cache dataset without data retrieval, and server can process queries as streams and does not need to hold data in memory. For example, this provides benefits to data federation and larger server resources because the system uses less resources and allows for an optimal usage of pooled and elastic resources.

As such embodiments of the present invention allow for parallel processing of many tasks since the data can be stored on server drive(s) because data stored on server drives in general allows to store many times more than RAM. Thus, virtual database program 110 can facilitate data retrieval by streaming (e.g., reading and forwarding) which allows a computing system (and users using the computer system) to free up or otherwise not to use the limited RAM of the server. Accordingly, the benefits of performing the operational steps of virtual database frame program 110 becomes even more important when multiple servers each process subset of a single dataset—federation Virtual database frame program 110 can allow for an interactive mode of work such as during an exploratory data analysis (e.g., as in Jupyter Notebook). Virtual database frame program 110 also allows for optimized invocation of aggregated series of transformation. For example, virtual database frame program 110 can enable processing of a series of commands as a batch (e.g., optimized instructions of what to do, i.e., a "large query") and where the data is (e.g., the underlying physical database information). In other words, the mechanism provided by virtual database frame program 110 can receive the overall series and devise/aggregate the commands, into a one or more complex queries which can be executed more efficiently—because the database compiler has both set of instructions of what to do (the large query) and it knows where the data are (the underlying physical database info).

Accordingly, embodiments of the present invention can provide value to varying levels of end users. In instances where an end user includes data scientists and analysts, embodiments of the present invention can reduce time for ideation to model creation by eliminating data movement overhead. Better models that consume more data at the source (e.g., when faced with big data, data scientists often copy a small subset of the data to their development system). From a business perspective, customers can achieve a faster return on invested from accelerated data science project and reap cost saving from optimized investment in infrastructure (e.g., same database infrastructure can serve both regular SQL and analytical workloads). Finally, database administrators and architects can benefit from the simplified data management and protection. The system architecture, as defined above includes fewer systems involved in data science projects and thus, include less points of failure.

In this embodiment, database 112 functions as a repository for stored content. In this embodiment, content refers to training data (e.g., large machine learning datasets) as well as user specific data. Content can include components, component categories, etc. In some embodiments, database 112 can function as a repository for one or more files containing user information. In this embodiment, database 112 is stored on server computer 108 however, database 112 can be stored on a combination of other computing devices (not shown) and/or one or more components of computing environment 100 (e.g., client computing device 102) and/or other databases that has given permission access to virtual database frame program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
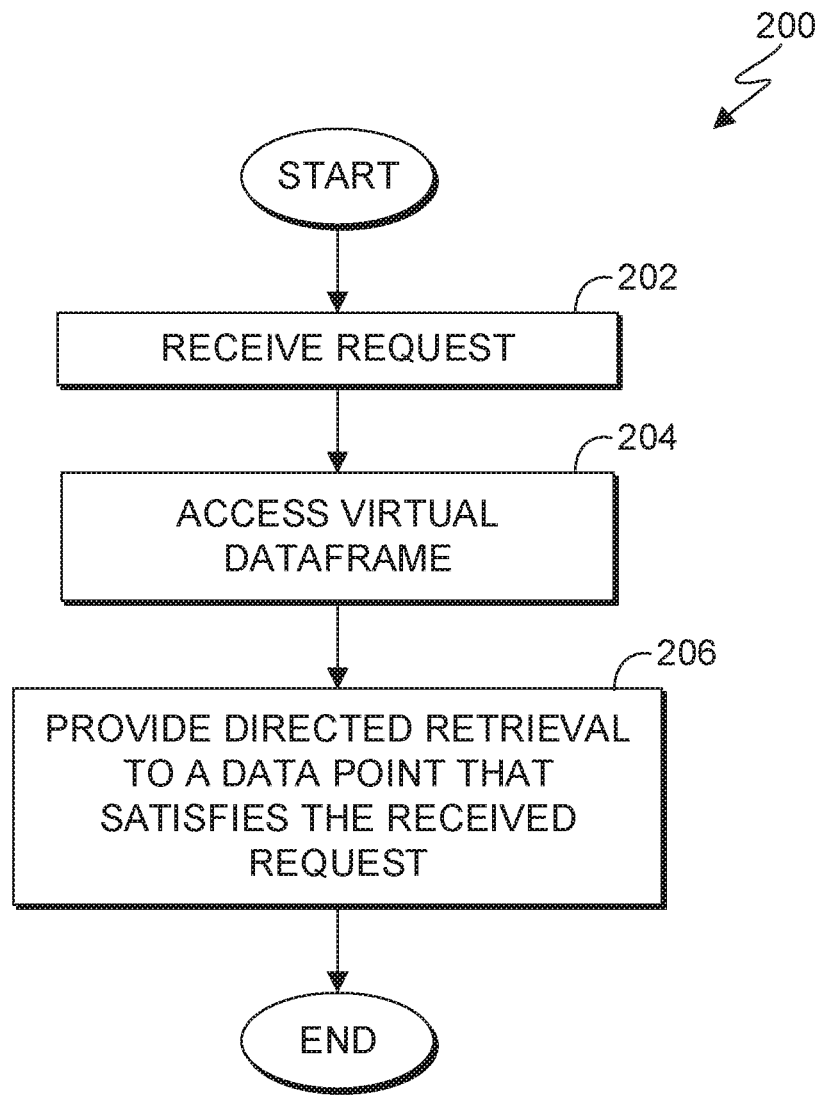
FIG. 2 is a flowchart depicting operational steps for processing large machine learning datasets in memory, in accordance with an embodiment of the present invention.

FIG. 2 is a flowchart 200 depicting operational steps for processing large machine learning datasets in memory, in accordance with an embodiment of the present invention.

In step 202, virtual database frame program 110 receives a request. In this embodiment, virtual database frame program 110 receives a request from client computing device 102. In other embodiments, virtual database frame program 110 can receive a request from one or more other components of computing environment 100.

In this embodiment, a request can include a request for information. Information, as used herein, can be defined as a request for one or more datapoints of a machine learning dataset contained in a database. The request can further include a request for one or more schemas of a VDF. Requests can also include specific sets (arrays of data). Requests can also include the whole dataset. For large datasets, the request would frequently have some sampling condition so that only representative data are retrieved.

In step 204, virtual database frame program 110 accesses a Virtual DataFrame (VDF). In this embodiment, virtual database frame program 110 accesses a Virtual DataFrame containing requested information in response to receiving a request. In this embodiment, virtual database frame program 110 performs the following function mechanisms to access and fulfill the request: processes nested VDF arguments, apply functions to a cache table, if needed, apply functions to a schema, and invocation chaining as previously described with respect to FIG. 1. In this manner, large amounts of data can be retrieved in various states using the functions and arguments as previously described with respect to FIG. 1

In step 206, virtual database frame program 110 provides a directed retrieval to a datapoint that satisfies the received request. In this embodiment, virtual database frame program 110 provides a directed retrieval to a datapoint that satisfies the received request by performing one of the above mentioned functions.

In this manner, virtual database frame program 110 can retrieve and provide directed retrieval in a more efficient manner because functions can be applied at cache dataset without data retrieval, and server can process queries as streams and does not need to hold data in memory.

Optionally, virtual database frame program 110 can allow for an interactive mode of work such as during an exploratory data analysis (e.g., as in Jupyter Notebook). Virtual database frame program 110 also allows for optimized invocation of aggregated series of transformation.

Further Comments and/or Embodiments

Embodiments of the present invention recognize that some solutions for data retrieval can be slow for a row-based database such as Vertica is designed for a column-based database. In contrast, solutions proposed by embodiments of the present invention provide for a single VDF object (Virtual DataFrame) for representing the cache database table on the database server. When the users perform any data transformation operations, such as replace missing values, that operation is directly executed on the cache table and persisted in the database.

Embodiments of the present invention have a goal of supporting both in-database data exploration and the data transformation. Embodiments of the present invention achieve this goal by executing the exploration and transformation queries on the database and returning the results summary to the end user. In the interim, that is, during processing of database exploration and transformation queries, embodiments of the present invention persist the results of the transformational queries in a cache table so that the user can incrementally execute on the database server different steps in their data transformation pipeline.

Embodiments of the present invention do not need to return the results of the query to the end user. For example, in instances where a transformational query is received, embodiments of the present invention save the results of the transformation in a cache table in the database. Embodiments of the present invention can then confirm or otherwise notify the user of the completion of the transformation. At this point, the user can request to see a sample of transformation or the summary of the transformation. In either scenario, embodiments of the present invention send only portions of relevant data rather than the full dataset (e.g., resulting in data transmission that takes up less memory). In summary, embodiments of the present invention address two primary goals: reduce the amount of data copy from the database to the client machine and the accelerate the execution of the query by pushing this to the database server.

Embodiments of the present invention recognize that current solutions may suggest memory optimization on the client side. These solutions fail to ensure delivery of (i.e., transmission of) larger datasets over the network at the first place. These solutions are based on data stored in a csv file that is already pulled from the data source. These solutions propose that the client-side techniques to process this data set on the client's machine and do not replace the role of relational databases and SQL for handling complex analytical tasks. Recognizing these deficiencies, embodiments of the present invention can process requests without requiring moving the raw data or the entire data to the client machine at the beginning of the analysis. Instead of copying the data over to the client machine, embodiments of the present invention push the operations that the client (i.e., user) wants to perform on a dataset to the database server and then optimally returns the execution summary, which will be less expensive to transfer over the network.

Embodiments of the present invention recognize that other solutions suggest chunking large data into smaller manageable size to fit into the memory and later combine the chunked results. Other techniques suggest throwing away part of the data (e.g., rows and columns) which result in less information. Embodiments of the present invention recognize that these solutions fail to solve the problem of moving large amounts of data across a network. Recognizing these deficiencies, embodiments of the present invention accomplishes two primary goals: reduce the amount of data copy from the database to the client machine and the accelerate the execution of the query by pushing this to the database server. Embodiments of the present invention achieve these goals without moving raw data over the network, does not require client-side solutions for chunking the data and does not require throwing away portions of the data to fit into the disk of a client machine. Instead, embodiments of the present invention leverage the database's in-built capabilities for parallelizing the query execution. In doing so, embodiments of the present invention allow the user to analyze the full dataset to unlock more analytical power from the data.

Some solutions attempt to solve the problem by supporting distributed processing of data in different compute nodes and retrieves data from different data nodes and bring them to a distributed in-memory data structure for more efficient distributed processing. These solutions avoid duplication of computation by providing a mechanism for sharing the computing between multiple clients. In contrast, embodiments of the present invention do not require retrieving the data from the databases to a separate machine for computation. Rather, embodiments of the present invention allow leaving the data at the source database and pushes the user operations to the data node.

Figure 3:
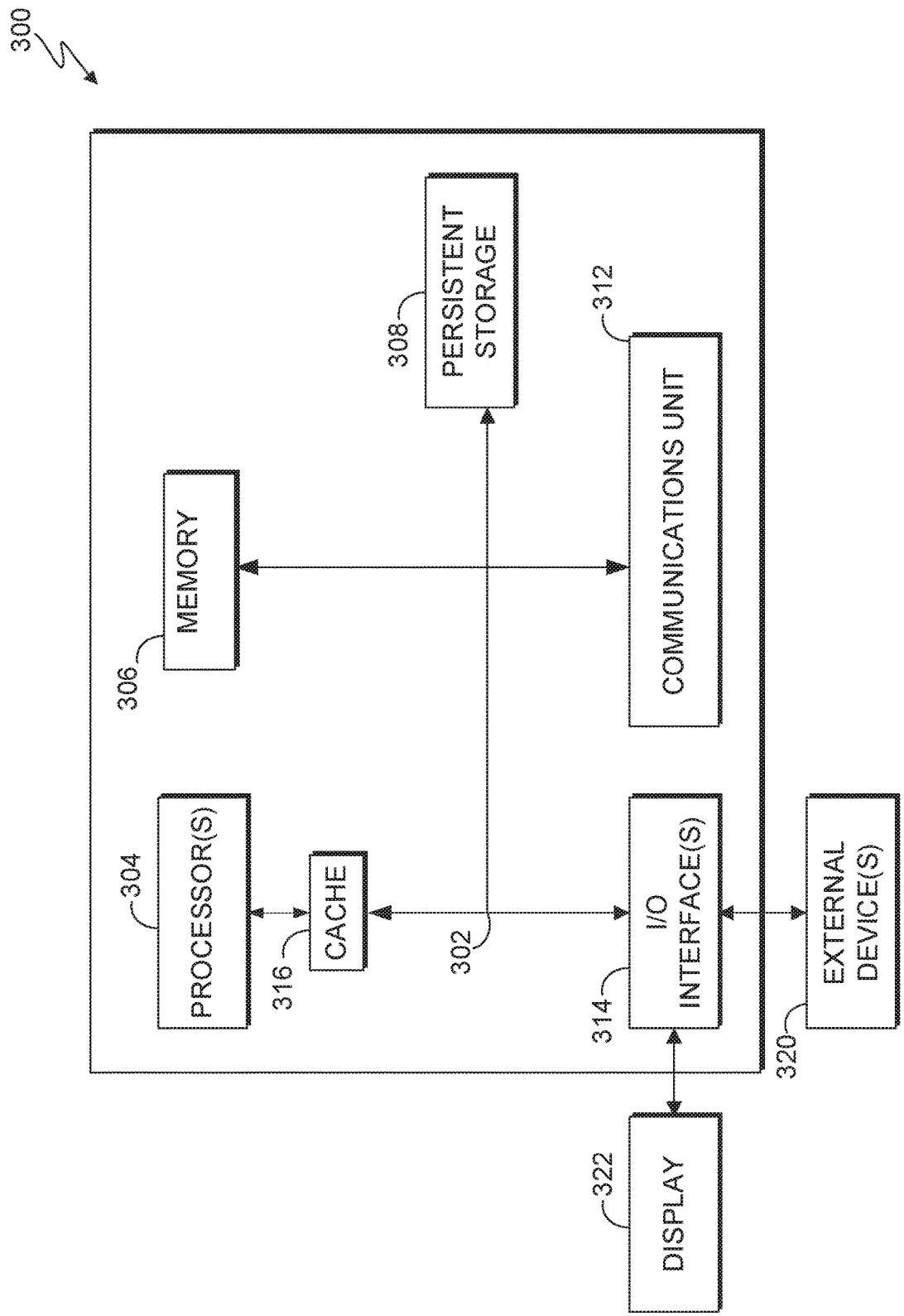
FIG. 3 is a block diagram of an example system, in accordance with an embodiment of the present invention.

FIG. 3 depicts a block diagram of components of computing systems within computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 300 includes communications fabric 302, which provides communications between cache 316, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Virtual database frame program 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 310 includes one or more network interface cards. Communications unit 312 may provide communications through the use of either or both physical and wireless communications links. Virtual database frame program 110 may be downloaded to persistent storage 308 through communications unit 312.

I/O interface(s) 314 allows for input and output of data with other devices that may be connected to client computing device and/or server computer. For example, I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., virtual database frame program 110, can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by a computing device, a request to access a datapoint of a machine learning dataset contained in a database;
   accessing, by the computing device, a virtual data frame that includes a schema which represents a structure of the machine learning dataset in the database, the virtual data frame comprising a two-dimensional structure that holds data aligned in a tabular format in rows and columns;
   processing, by the computing device, one or more virtual data frame arguments associated with the received request;
   facilitating, by the computing device, a zero copy retrieval of the datapoint of the machine learning dataset utilizing the virtual data frame, wherein the schema of the virtual data frame allows for a directed retrieval of the datapoint;
   invocation chaining, by the computing device, the one or more virtual data frame arguments, first applied functions, and second applied functions;
   executing the invocation chaining against a cache table of the database, wherein the cache table contains any intermediary result resulting from operations currently running on the database, wherein the virtual data frame comprises a shallow copy of the cache table, the shallow copy having fewer columns than the cache table has, and wherein the second applied functions are applied to the schema such that a second virtual data frame that points to the cache table is generated; and
   returning, by the computing device, the retrieved datapoint in response to the request.

2. The computer-implemented method of claim 1, wherein the virtual data frame replicates a pandas.DataFrame.

3. The computer-implemented method of claim 1, wherein the schema represents columns or data types contained within the database.

4. The computer-implemented method of claim 1, wherein the one or more virtual data frame arguments includes nested virtual data frame arguments.

5. A computer program product comprising:
   one or more computer readable storage media and program instructions stored on the one or more computer readable storage media, the program instructions comprising:
   program instructions to receive a request to access a datapoint of a machine learning dataset contained in a database;
   program instructions to access a virtual data frame that includes a schema which represents a structure of the machine learning dataset in the database, the virtual data frame comprising a two-dimensional structure that holds data aligned in a tabular format in rows and columns;
   program instructions to process one or more virtual data frame arguments associated with the received request;
   program instructions to facilitate a zero copy retrieval of the datapoint of the machine learning dataset utilizing the virtual data frame, wherein the schema of the virtual data frame allows for a directed retrieval of the datapoint;
   program instructions to invocation chain the one or more virtual data frame arguments, first applied functions, and second applied functions;
   program instructions to execute the invocation chaining against a cache table of the database, wherein the cache table contains any intermediary result resulting from operations currently running on the database, wherein the virtual data frame comprises a shallow copy of the cache table, the shallow copy having fewer columns than the cache table has, and wherein the second applied functions are applied to the schema such that a second virtual data frame that points to the cache table is generated; and program instructions to return the retrieved datapoint in response to the request.

6. The computer program product of claim 5, wherein the virtual data frame replicates a pandas.DataFrame.

7. The computer program product of claim 5, wherein the schema represents columns or data types contained within the database.

8. The computer program product of claim 5, wherein the one or more virtual data frame arguments includes nested virtual data frame arguments.

9. A computer system for comprising:
one or more computer processors;
one or more computer readable storage media; and
program instructions stored on the one or more computer readable storage media for execution by at least one of the one or more computer processors, the program instructions comprising:
program instructions to receive a request to access a datapoint of a machine learning dataset contained in a database;
program instructions to access a virtual data frame that includes a schema which represents a structure of the machine learning dataset in the database, the virtual data frame comprising a two-dimensional structure that holds data aligned in a tabular format in rows and columns;
program instructions to process one or more virtual data frame arguments associated with the received request;
program instructions to facilitate a zero copy retrieval of the datapoint of the machine learning dataset utilizing the virtual data frame, wherein the schema of the virtual data frame allows for a directed retrieval of the datapoint;
program instructions to invocation chain the one or more virtual data frame arguments, first applied functions, and second applied functions;
program instructions to execute the invocation chaining against a cache table of the database, wherein the cache table contains any intermediary result resulting from operations currently running on the database, wherein the virtual data frame comprises a shallow copy of the cache table, the shallow copy having fewer columns than the cache table has, and wherein the second applied functions are applied to the schema such that a second virtual data frame that points to the cache table is generated; and
program instructions to return the retrieved datapoint in response to the request.

10. The computer system of claim 9, wherein the virtual data frame replicates a pandas.DataFrame.

11. The computer system of claim 9, wherein the schema represents columns or data types contained within the database.

12. The computer system of claim 9, wherein the one or more virtual data frame arguments includes nested virtual data frame arguments.

13. A computer system comprising:
one or more computer processors;
one or more computer readable storage media; and
program instructions stored on the one or more computer readable storage media for execution by at least one of the one or more computer processors, the program instructions comprising:
program instructions to provide a single virtual data frame stored on the one or more computer readable storage media for representing a cache database table that represents a current state of a dataset on a database server, the virtual data frame comprising a two-dimensional structure that holds data aligned in a tabular format in rows and columns;
program instructions to process one or more virtual data frame arguments;
program instructions to facilitate a zero copy retrieval of a datapoint of a machine learning dataset utilizing the virtual data frame, wherein a schema of the virtual data frame allows for a directed retrieval of the datapoint;
program instructions to invocation chain the one or more virtual data frame arguments, first applied functions, and second applied functions; and
program instructions to execute the invocation chaining against the cache database table, wherein the cache database table contains any intermediary result resulting from operations currently running on the dataset, wherein the virtual data frame comprises a shallow copy of the cache database table, the shallow copy having fewer columns than the cache database table has, and wherein the second applied functions are applied to the schema such that a second virtual data frame that points to the cache database table is generated.

14. The computer system of claim 13, wherein the program instructions stored on the one or more computer readable storage media further comprise:
program instructions to receive data transformation operations; and
program instructions to, in response to receiving data transformation operations, execute the received database transformation operations directly on the cache database table that is persisted on the database server.

15. The computer system of claim 14, wherein the program instructions stored on the one or more computer readable storage media further comprise:
program instructions to support both in database data exploration and data transformation queries.

16. The computer system of claim 14, wherein the program instructions to support both in database data exploration and data transformation operations comprise:
program instructions to execute the data exploration and the data transformation queries on the database server; and
program instructions to persist results of the data transformation queries in the cache table in a manner that can allow an end user to incrementally execute on the database server, different steps in a data transformation pipeline.

17. The computer system of claim 14, wherein the program instructions stored on the one or more computer readable storage media further comprise:
program instructions to return a results summary to an end user.

* * * * *